United States Patent
Baughman et al.

(10) Patent No.: US 8,793,381 B2
(45) Date of Patent: Jul. 29, 2014

(54) WORKLOAD ADAPTIVE CLOUD COMPUTING RESOURCE ALLOCATION

(75) Inventors: Aaron K. Baughman, Silver Spring, MD (US); Linda M. Boyer, Ossining, NY (US); Christopher F. Codella, LaGrangeville, NY (US); Richard L. Darden, Leesburg, VA (US); William G. Dubyak, Severna Park, MD (US); Arnold Greenland, Silver Spring, MD (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 13/533,164

(22) Filed: Jun. 26, 2012

(65) Prior Publication Data

US 2013/0346614 A1 Dec. 26, 2013

(51) Int. Cl.
    *G06F 15/173* (2006.01)
(52) U.S. Cl.
    USPC .......................... 709/226; 709/223; 709/224
(58) Field of Classification Search
    USPC .......................... 709/223–224, 226
    See application file for complete search history.

(56) References Cited

U.S. PATENT DOCUMENTS

| | | | |
|---|---|---|---|
| 5,031,089 A | | 7/1991 | Liu et al. |
| 5,826,238 A | | 10/1998 | Chen et al. |
| 6,738,758 B1 * | | 5/2004 | Li et al. ............ 709/223 |
| 7,793,297 B2 * | | 9/2010 | Aggarwal et al. ............ 718/104 |
| 7,793,308 B2 | | 9/2010 | Gusler et al. |
| 7,908,384 B2 | | 3/2011 | Tada |
| 7,941,332 B2 | | 5/2011 | Liu et al. |
| 2007/0124422 A1 | | 5/2007 | Hwang et al. |
| 2007/0266083 A1 * | | 11/2007 | Kobashi et al. ............ 709/203 |
| 2008/0066072 A1 * | | 3/2008 | Yurekli et al. ............ 718/104 |
| 2008/0183543 A1 | | 7/2008 | Li et al. |
| 2008/0222024 A1 * | | 9/2008 | Fellenstein et al. ............ 705/37 |
| 2008/0262991 A1 | | 10/2008 | Kapoor et al. |
| 2008/0306866 A1 * | | 12/2008 | Fellenstein et al. ............ 705/37 |
| 2009/0055436 A1 | | 2/2009 | Ayeni |
| 2009/0328048 A1 | | 12/2009 | Khan et al. |
| 2010/0131556 A1 | | 5/2010 | Meijer et al. |
| 2010/0138405 A1 | | 6/2010 | Mihaila et al. |
| 2010/0228858 A1 | | 9/2010 | Eilam et al. |

(Continued)

FOREIGN PATENT DOCUMENTS

WO 2011080053 A1 7/2011

OTHER PUBLICATIONS

Myerson et al., "Craft a cloud performance metrics policy", www.ibm.com/developerworks/cloud/library/cl-cloudperformmetrics/.

(Continued)

*Primary Examiner* — Waseem Ashraf
(74) *Attorney, Agent, or Firm* — Douglas A. Lashmit; Hoffman Warnick LLC (57) ABSTRACT

A workload associated with a task is assessed with respect to each of a plurality of computing paradigms offered by a cloud computing environment. Adaptive learning is employed by maintaining a table of Q-values corresponding to the computing paradigms and the workload is distributed according to a ratio of Q-values. The Q-values may be adjusted responsive to a performance metric and/or a value, reward, and/or decay function. The workload is then assigned to available computing paradigms to be performed with improved utilization of resources.

14 Claims, 4 Drawing Sheets

(56) References Cited

U.S. PATENT DOCUMENTS

| | | | |
|---|---|---|---|
| 2011/0016214 A1* | 1/2011 | Jackson | 709/226 |
| 2011/0078014 A1* | 3/2011 | Feldman et al. | 705/14.42 |
| 2011/0153824 A1 | 6/2011 | Chikando et al. | |
| 2011/0161294 A1 | 6/2011 | Vengerov et al. | |
| 2011/0161979 A1 | 6/2011 | Flemming et al. | |
| 2011/0173626 A1 | 7/2011 | Chi et al. | |
| 2011/0295634 A1* | 12/2011 | Bhamidipaty et al. | 705/7.12 |
| 2011/0320606 A1* | 12/2011 | Madduri et al. | 709/226 |
| 2012/0191858 A1* | 7/2012 | Madduri et al. | 709/226 |
| 2012/0197677 A1* | 8/2012 | Bhamidipaty et al. | 705/7.13 |
| 2012/0198466 A1* | 8/2012 | Cherkasova et al. | 718/104 |
| 2013/0246208 A1* | 9/2013 | Jain et al. | 705/26.3 |
| 2013/0339972 A1* | 12/2013 | Zhang et al. | 718/104 |
| 2013/0346994 A1* | 12/2013 | Chen et al. | 718/104 |
| 2014/0007128 A1* | 1/2014 | Schroth et al. | 718/104 |

OTHER PUBLICATIONS

Zi-Jin et al, "Two New Push-Pull Balanced Data Dissemination Algorithms for Any-Type Queries in Large-Scale Wireless Sensor Networks", The International Symposium on Parallel Architectures, Algorithms, and Networks, 2008, IEEE.

Manfredi, Victoria, "Q-learning (QL)", http://www.cra.org/Activities/craw-archive/dmp/awards/2001/manfredi.

* cited by examiner

WORKLOAD ADAPTIVE CLOUD COMPUTING RESOURCE ALLOCATION

BACKGROUND

The disclosure relates generally to large scale analytical computing, and more particularly to distribution of tasks among cloud computing resources for enhanced computing efficiency.

A popular type of large scale computing is cloud computing, in which virtualized resources may interact and/or be accessed via a communications system, such as a computer network. Virtualized resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

Cloud computing may be provided as a service over the Internet, such as in the form of "infrastructure as a service" (IaaS), "platform as a service" (PaaS), and/or "software as a service" (SaaS). IaaS may typically provide physical or virtual computing devices and/or accessories on a fee-for-service basis and onto which clients/users may load and/or install, and manage, platforms, applications, and/or data. PaaS may deliver a computing platform and solution stack as a service, such as, for example, a software development platform, application services, such as team collaboration, web service integration, database integration, and/or developer community facilitation. SaaS may deploy software licensing an application to customers for use as a service on demand. SaaS software vendors may host the application on their own clouds or download such applications from clouds to cloud clients, disabling the applications after use or after an on-demand contract expires.

The provision of such services allows a user access to as much in the way of computing resources as the user may need without purchasing and/or maintaining the infrastructure, such as hardware and/or software, that would be required to provide the services. For example, a user may instead obtain access via subscription, purchase, and/or otherwise securing access. Thus, cloud computing may be a cost effective way to deliver information technology services. However, cloud computing may also be hindered by issues of data security, privacy, and other policy challenges. In addition, some types of tasks or analyses may be handled better by different types of resources and/or techniques, which may not be taken into account in existing systems. If an analysis is sent to a less optimal computing device and/or a less optimal analytical technique is applied, analysis may take longer to complete than may be desirable. Traditional ways of allocating resources focus on resource utilization and not on assessing the workload and adapting and optimizing the allocation on the workload on the characteristics of both the workload and the compute resources.

BRIEF SUMMARY

Embodiments of the invention disclosed herein may take the form of a cloud computing system having a computing resource providing a first service offering at least a first computing paradigm and a second computing paradigm. The cloud computing system may also have a workload policy manager configured to identify a task to be assessed and to assign a workload associated with the task to at least one of the first computing paradigm or the second computing paradigm according to a resource allocation control method. The resource allocation control method may configure the workload policy manager to initialize a table of Q-values for the task to be assessed. The table of Q-values may include a respective Q-value for each respective computing paradigm, each Q-value being set to a respective initial value. The resource allocation method may further configure the workload policy manager to select one of the first computing paradigm or the second computing paradigm as a current computing paradigm and to determine at least one performance metric of the task to be assessed for the current computing paradigm. Responsive to an assessment of the at least one performance metric, the resource allocation method may configure the workload policy manager to determine a respective change to be applied to a respective Q-value associated with each computing paradigm and to apply the respective changes to the respective Q-values. The workload policy manager may then be configured by the resource allocation method to reassign a workload associated with the task may then be reassigned based on a ratio between the Q-values.

Another embodiment may include a computer program product for enabling resource allocation in a cloud computing environment control system, the cloud computing environment including a first computing resource providing at least a first computing paradigm and a second computing paradigm. The control system may be configured for communication with the first computing resource and a client, and the control system may further include a computing device and a storage device arranged to store the computer program product. The computing device may be configured to execute the computer program product, and the computer program product may comprise instructions in the form of computer executable program code that when executed may configure the control system to identify a task to be assessed, set a respective Q-value for each computing paradigm to an initial value, and select one of the first computing paradigm or the second computing paradigm for evaluation as a current computing paradigm. Additional code may configure the control system to gather a performance metric for the current computing paradigm, assess the performance metric, and determine a change to be applied to each respective Q-value of the computing paradigms offered by the cloud computing system. Code may also configure the control system to apply the changes to the current computing paradigm and the other computing paradigm to create new Q-values, and to assign a workload associated with the task to be assessed according to a ratio of the new Q-values.

Embodiments of the invention may also take the form of a cloud computing environment resource allocation method that may identify a task to be assessed, set a respective Q-value for each computing paradigm to an initial value, and select one of the first computing paradigm or the second computing paradigm for evaluation as a current computing paradigm. Additionally, the resource allocation method may gather a performance metric for the current computing paradigm, assess the performance metric, and determine a change to be applied to each respective Q-value of the computing paradigms offered by the cloud computing system. Responsive to the determination of a change to be applied to each respective Q-value, the resource control method may in embodiments apply the changes to the current computing paradigm and the other computing paradigm to create new Q-values, and assigning a workload associated with the task to be assessed according to a ratio of the new Q-values.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE SEVERAL VIEWS OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

The detailed description explains embodiments of the invention, together with advantages and features, by way of example with reference to the drawings.

DETAILED DESCRIPTION

Figure 1:
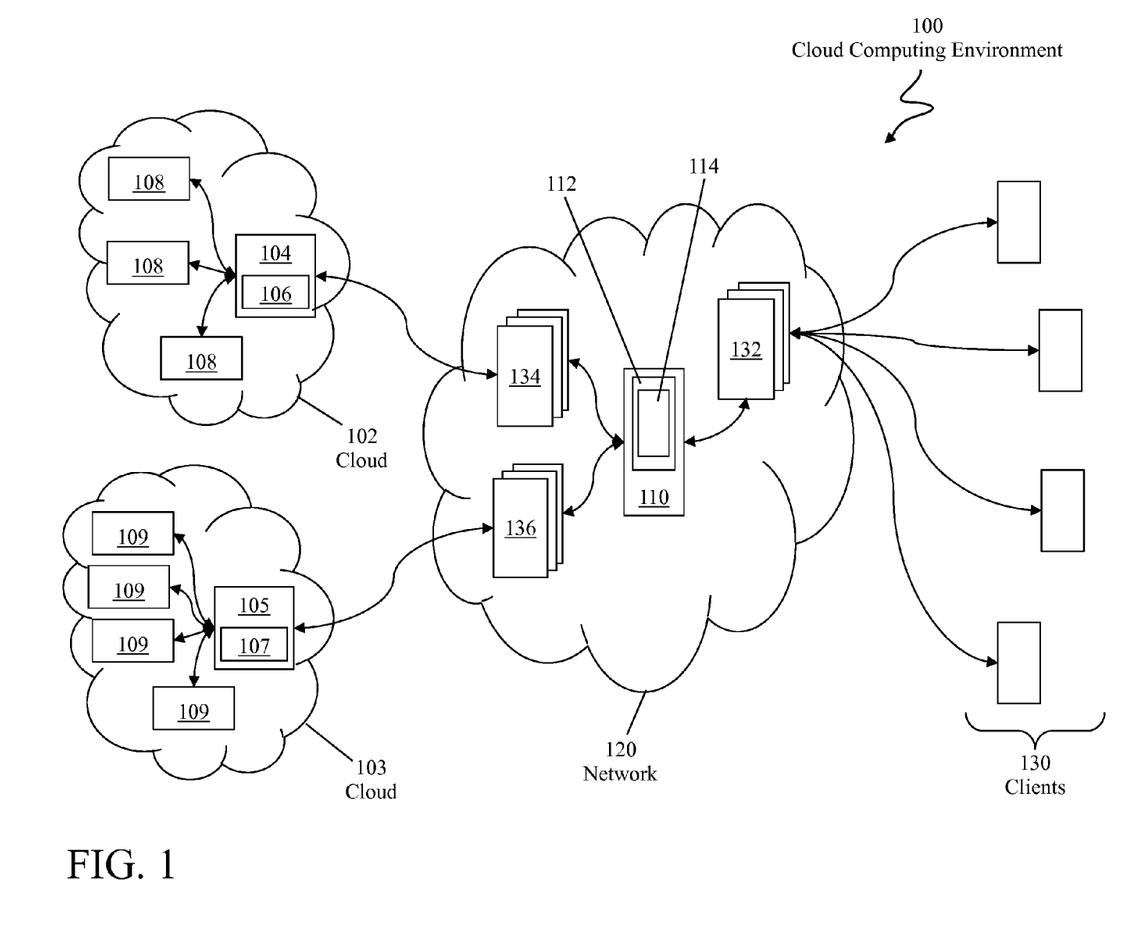
FIG. 1 shows a schematic flow diagram of a cloud computing system that may employ embodiments of the invention disclosed herein.

Aspects of the invention may predict and/or monitor performance of a workload using adaptive learning responsive to the performance of workloads in a cloud computing system, as well as to a type of data and/or workload. More specifically, embodiments of the invention may learn characteristics of a workload and of the workload as it would run on different available computing paradigms and learn how to better allocate resources among the different available computing paradigms. Referring to FIG. 1, a cloud computing system or environment 100 may support data processing workload administration and resource allocation according to embodiments. Cloud computing environment 100 may include a number of clouds 102, 103, each of which may be a network-based, distributed data processing system that may provide one or more cloud computing services, such as SaaS, PaaS, and/or IaaS as discussed above. Additional cloud computing services that might be provided include utility computing, managed services, web services, and other services as may be desired, suitable, and/or available to be provided now and/or in the future. Each cloud 102, 103 may be in communication with a server 110 via a network 120, which may also be in communication with one or more clients 130 via network 120. A client 130 may submit a request 132, such as a data processing request, to server 110, which may assign request 132 among clouds 102, 103 as one or more jobs 134, 136 using a workload policy manager 112 running on server 110. Workload policy manager 112 may include a resource allocation policy 114 as will be described below. Each cloud 102, 103 may include, for example, a respective first server 104, 105 running a respective job placement engine 106, 107 that may distribute jobs 134, 136 to a respective plurality of servers 108, 109.

In this manner, cloud computing system 100 may connect cloud clients 130 with a cloud 102, 103 so that clients 130 may access services provided by cloud computing system 100. Workload policy manager 112 may include hardware and/or software configured to assign tasks and/or workloads, such as a data processing request, to computing resources provided by one or more clouds 102, 103 according to a resource allocation policy 114 of embodiments. Workload policy manager 112 may, for example, receive a data processing request 132 from a client 130, assess the request, and assign the request as a job 134, 136 among one or more processors, processing nodes, computing paradigms and/or architectures, and/or other resources available in cloud computing system 100 as may be needed and/or desired to satisfy the request. Resource allocation policy 114 in embodiments may employ adaptive learning as will be described below.

In embodiments, cloud computing system 100 may employ one or more computing paradigms and/or architectures, such as, for example, a data push computing paradigm, a code push computing paradigm, and/or one or more hybrid computing paradigms including elements of code push and data push. For example, a code push paradigm could be implemented by Java Sockets with Custom Disk Storage (JSCDS) and Hadoop, and adapters may be implemented between the resource allocation system of embodiments and both JSCDS and Hadoop to normalize measurements and metrics. Resource allocation policy 114 accordingly may adjust the assignment of a new workload, reassign an existing workload to a different resource if it becomes bound on a resource to which it is assigned, and/or learn from these experiences to better assign incoming work.

Figure 2:
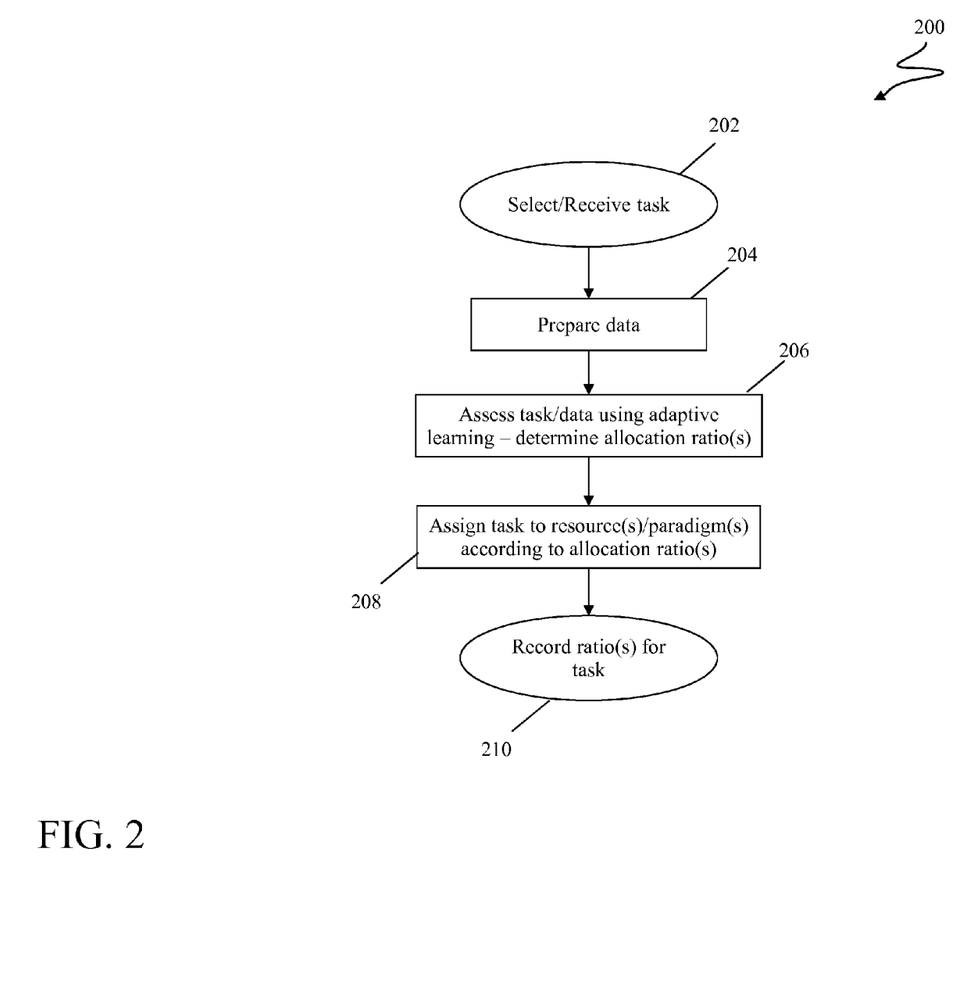
FIG. 2 shows a schematic flow diagram of a portion of a method according to embodiments of the invention disclosed herein.

More specifically, and with reference to FIG. 2, embodiments may include a resource allocation method 200 in which a task may be detected, selected, or received (block 202). Data related to the task may be prepared (block 204), such as by creating a data set, and the task may be assessed for an expected workload (block 206), which may include determining an allocation ratio. For example, an allocation ratio may be represented in the form $p_1:p_2:p_3: \ldots :p_n:p_{n+1}$, where each of $p_n$ represents a weight for a respective computing paradigm and/or architecture. In embodiments, an allocation ratio may be determined using adaptive learning as will be explained below so that each paradigm may have a respective value representing an expected workload or performance resulting from using the paradigm to process the data processing request. The task may then be assigned to cloud computing resources and/or computing paradigms in accordance with the assessment and/or an allocation ratio (block 208), and any allocation ratio may be stored or recorded (block 210).

One adaptive learning technique that may be employed in embodiments is reinforcement learning, in which a control system, such as workload policy manager 112, may interact with cloud computing environment 100, observe the results of interacting, and adjust the manner in which subsequent interaction is performed. The interaction may be governed or at least influenced by a decision making function or policy, and the observations made may be referred to as a "scalar reward" or "reinforcement." By adjusting policy and/or interaction, reinforcement learning adapts to changes and/or unpredictable developments in its environment. Reinforcement learning may be useful in embodiments since the strategy(ies), computing paradigm(s), architecture(s), and/or other resources that might be best used in assigning workloads to resources and vice versa may not be clear and/or may change. In embodiments, a policy may take the form of a function, while in other embodiments, a look-up table may be used to represent a policy.

Reinforcement learning may be based on one or more value functions and/or one or more reward or return functions. A reward function may define a goal to be achieved and may correlate or map each state and/or action, such as in a state-action pair, of an environment to a respective number. A reward function may further identify events as beneficial and/or detrimental so that the policy under which the reward function operates may be modified to achieve a more beneficial result for a subsequent action. An immediate desirability of a state may therefore be determined.

A value function may be used to represent what is beneficial over a longer period of time than the reward function. It may be used to estimate a total amount of reward an agent, such as a cloud computing control system, may accumulate in the future starting from a given state, which total amount of reward is the value of the given state. A value function may further take into account subsequent states and their estimated rewards as part of the estimation of a value of a given state. In reinforcement learning, states of highest value are typically sought, as opposed to states of highest reward, since states of highest value may yield the greatest amount of reward over time.

A model of an environment to be controlled may also be included in a reinforcement learning implementation so as to simulate behavior of the environment. Using such a model, a response of the environment to an action in a state may be predicted, providing additional reinforcement to a reinforcement learning agent, such as a cloud computing control system according to embodiments. For example, a model may take the form of a look-up table and/or computer code configured to take into account characteristics, parameters, and/or other factors of a cloud computing system into account to that response of the cloud computing system to a particular workload may be estimated, which may yield improved estimates of state-action pair values and rewards.

For example, a function $V^\pi(s)$ may represent an expected return when starting in a state s and under a policy $\pi$ and may be referred to as a state-value function for policy $\pi$. In addition, a function $Q^\pi(s, a)$ may represent an expected return when starting in a state s, taking an action a, and under a policy $\pi$ and may be referred to as an action-value policy for policy $\pi$. Such value functions may be used to choose an action that will provide the best return in a given state.

Temporal difference learning may be used to estimate value functions. Broadly, a value of the final reward for each state is estimated, and a state-action value may be updated for each step. Thus, for the first example value function above, $$V(s_t) \leftarrow V(s_t) + \alpha[V(s_{t+1}) - V(s_t)]$$

where $s_t$ is the state visited at time t, $s_{t+1}$ is the estimated step at time t+1, and $\alpha$ is a constant parameter referred to as a learning rate or step-size parameter. However, it may be advantageous to include reward r and a discount factor $\gamma$ so that a state-value function may take the form $$V(s_t) \leftarrow V(s_t) + \alpha[r_{t+1} + \gamma V(s_{t+1}) - V(s_t)]$$

where $s_t$ is the state visited at time t, $r_{t+1}$ is the observed reward at time t+1, $\alpha$ is a constant parameter, and $\gamma$ is a discount factor. A temporal difference technique that learns the policy used to make decisions may be referred to as "on-policy," whereas a temporal difference technique that learns a policy for behavior and a different policy for estimation of the value function(s) may be described as "off-policy." In on-policy techniques, the policy allows exploration, such as by including a slack parameter or the like, and may not always choose an action that gives the highest return, but uses actual observations and experience in any updates. By contrast, in off-policy techniques, exploration may be separated from control so that hypothetical actions may be used in value function estimation and policy updates.

In embodiments, an off-policy temporal difference learning technique that may be used is Q-learning. In Q-learning, an optimal policy may be learned even when actions are selected under an exploratory or even random policy. A value function Q(s, a) may be assigned arbitrary initial values and then for each assessment to be performed, a state s may be initialized, and an action a may be selected from s using policy derived from the value function Q itself. Action a may then be performed, and the result r and subsequent state s' may be observed. The value function may then be updated as follows:

$$Q(s,a) \leftarrow (s,a) + \alpha[r + \gamma \cdot \max_{a'} Q(s',a') - Q(s,a)]$$

$$s \leftarrow s'.$$

In the value function above, $\alpha$ is a learning rate, $\gamma$ is a discount factor, and $\max_\alpha$ is a maximum attainable reward for the next state. The learning rate may be set between 0 and 1, where a higher value means learning occurs more quickly. The discount factor may be set between 0 and −1 and renders a future reward less valuable than a current reward.

Another temporal difference learning technique that may be employed in embodiments is known as Sarsa, which is on-policy and is named from the parameters used in updates in the value function Q(s, a, r, s', a'). Sarsa may not include the maximum learning rate, and after initialization of the Q-value table and state may consider a subsequent action a'. Thus, after state s' is initialized, an action a may be selected from s using policy derived from Q, the action a may be performed, r and s' may be observed, and a subsequent action a' may be selected from s' using policy derived from Q. The value function may then be used thus:

$$Q(s,a) \leftarrow Q(s,a) + \alpha[r + \gamma \cdot Q(s',a') - Q(s,a)]$$

$$s \leftarrow s'$$

$$a \leftarrow a'$$

While reinforcement learning, particularly temporal difference learning, such as Q-learning and Sarsa-learning, have been discussed in conjunction with embodiments above, other adaptive learning techniques may be employed in embodiments. For example, dynamic programming, Monte Carlo methods, eligibility traces, actor-critic methods, gradient-descent methods, linear methods, and/or any other suitable reinforcement learning methodology may be employed. In addition, other forms of temporal difference learning may be used in embodiments, such as, but not limited to, TD prediction, R-learning, and/or other temporal difference learning techniques as may be suitable and/or desired. Using such reinforced learning techniques, embodiments may learn optimal data processing architectures, adapt to computing load and high entropy environments, reconcile changes for inter computing modes, augment human preferences, and/or mitigate processing errors. In a practical implementation of reinforcement learning, such as Q-learning, the value function may be expressed as a table of Q-values. Thus, a table of Q-values may be assigned initial values that are updated based on observations and the value function, as well as the learning rate and discount factor. Characteristics of the workload and characteristics of the computing resources available may be determined to better allocate resources to a given task.

Embodiments may employ a reinforcement learning technique in the spirit of the types discussed above, but particularly suitable for cloud computing resource allocation, such as in resource allocation policy 114 shown in FIG. 1 and as part of assessing and/or assigning a task as seen in FIG. 2. As mentioned above, one or more computing paradigms and/or architectures may be available in cloud computing environment 100, such as a data push computing paradigm, a code push computing paradigm, one or more hybrids of data and code push paradigms, and/or additional computing paradigms as may be desired and/or suitable. As is known, a data push computing paradigm may stratify data related to a data processing request to produce a stratified data set. Such a stratified data set may then be pushed through an analytical pipeline. In addition, a code push computing paradigm may use or perhaps prepare a similar stratified data set, but the stratified data set may instead be placed across a plurality of nodes for parallel processing.

Figure 3:
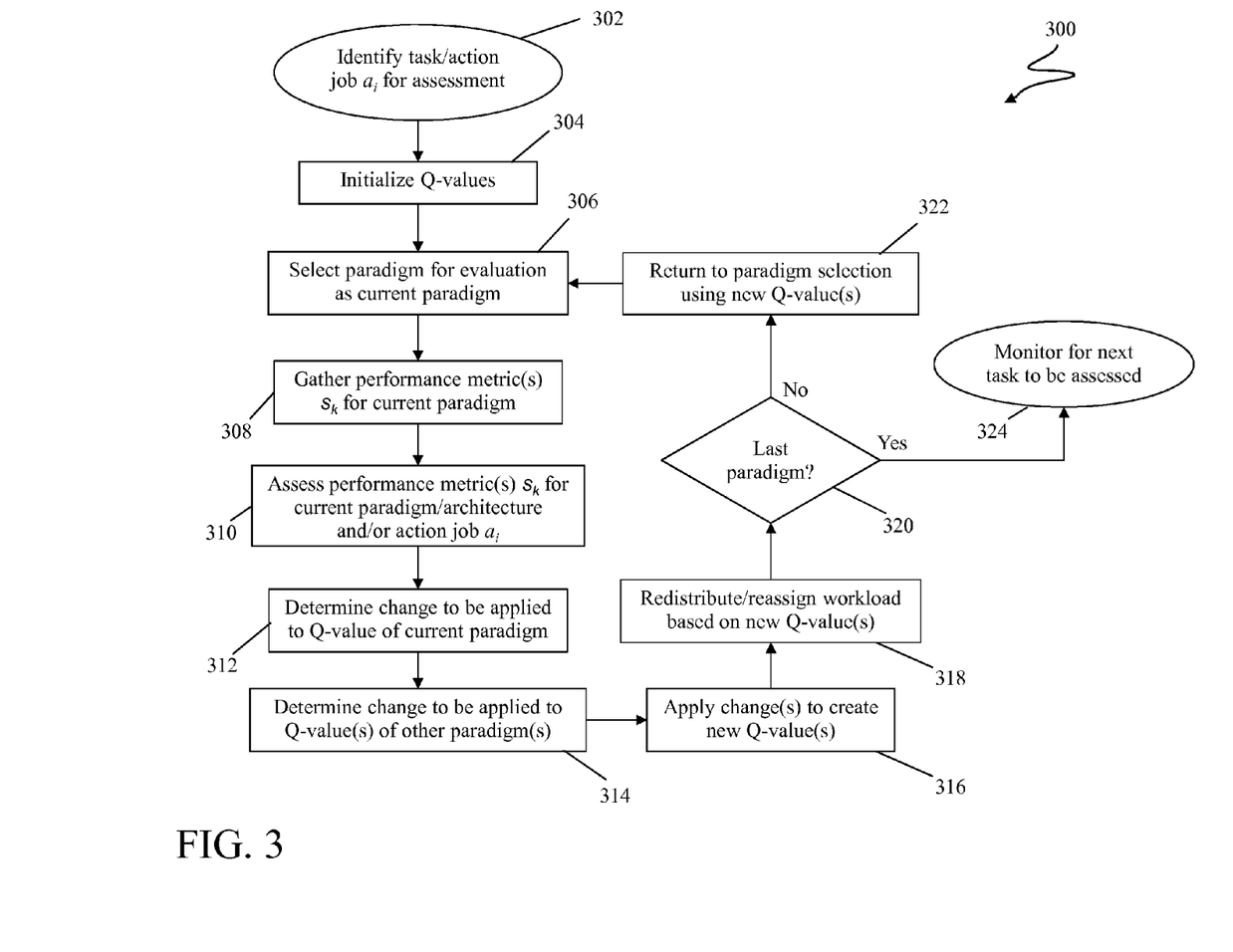
FIG. 3 shows schematic flow diagram of a portion of a method according to embodiments of the invention disclosed herein.

With reference to FIG. 3, another example of a resource allocation method 300 according to embodiments may select and/or receive a task or action job for assessment (block 302), which may include assigning the task or action job to an initial computing paradigm. Each computing paradigm or architecture employed in embodiments may be represented by a respective action, $a_i$, which may have a respective associated Q-value, $q_k$. For example, $a_1$ may represent code push, $a_2$ may represent data push, and $a_3$ may represent a hybrid approach, with additional actions representing other computing paradigms and/or architectures that may be available.

Weights or Q-values associated with the task to be assessed may be initialized (block 304). Where knowledge based prior Q-values are not available, a bootstrapped uniform weighted model may be employed to initialize the Q-values so as to learn how to distribute data and code to improve system performance. This may be referred to as Uniform Prior Reinforcement Learning (UPRL) and may set all Q-values to a same value such that $q_1=q_2=q_3$ and $$\sum_{k=1}^{3} q_k = 1.$$

Where prior Q-values are available, however, they may be used to initialize the Q-values in embodiments. This may be referred to as Knowledge Based Prior Reinforcement Learning (KBPRL) and may set Q-values to prior values selected such that the sum of the Q-values is one.

Each computing paradigm employed may be monitored to obtain a respective performance metric vector or system performance vector, $\bar{s}_k$, each vector including one or more performance metrics for a respective computing paradigm as it may be applied to a given task. Thus, a paradigm may be selected for evaluation as a current paradigm (block 306), and one or more metrics for the current paradigm may be received and/or gathered (block 308). Examples of metrics that might be used include, but are not limited to, statefulness, versioning, resource threshold, user threshold, data request threshold, and/or response threshold. Statefulness may include, for example, a measure of how well the application responds correctly in the subsequent states. Versioning metrics may include, for example, a measure of how well a new build of an application avoids breaking an existing application's functions even if the previous application's statefulness has responded correctly from one state to another until the application task's end. Versioning breaks may occur when assigning duplicate version names or numbers to the application. Resource threshold may include, for example, a measure of how well resource consumption is balanced dynamically for applications in a cloud. The resource threshold level in embodiments may be at or below a maximum number of additional resource instances that could be consumed. When resource consumption exceeds the threshold level, such as during a spike in workload demands, additional resource instances may be allocated. When demand decreases to or below the threshold level, resources instances that have been created may be released and/or put to other use. User threshold may include, for example, a measure of how well a user can access an application up to a limit of concurrent users that may be specified in a user license from an application provider. For example, if a license is limited to 3,000 users but only allows a maximum of 2.500 users to access concurrently, then a user threshold level may be set to 2,000 concurrent users. If the number of concurrent users is at or below the user threshold for an application, the application is continuously available, assuming that resource consumption and data requests are below their respective threshold levels. Data request threshold may include, for example, a measure of a number of data requests that may be concurrently received and/or processed. Response threshold may include, for example, a measure of how quickly an application may respond to a user data request and/or how quickly one part of an application may respond to another part of the same application and may be set to a maximum response time. Additionally, processing time, disk input/output (I/O), and/or memory consumption may be employed as performance metrics.

Resource allocation method 300 may additionally provide that one or more performance metrics $s_k$ may be assessed for the current paradigm (block 310), which may also be specific to the task or action job to be assessed. In assessing performance metrics, embodiments may use a target or threshold vector, $\bar{t}$, including target and/or threshold and/or desired values for one or more performance metrics of a cloud computing system. Each system performance vector, $\bar{s}_k$, may be correlated to the $\bar{t}$ vector to effect a measure of performance of each computing paradigm and/or architecture in use. The target vector may be provided in any suitable manner, such as being defined by a user, predefined and retrieved from a storage device, and/or determined by the system. In embodiments where $\bar{t}$ is not defined, the $\bar{s}$ vectors for respective paradigms/architectures may be compared to each other. During the comparison, the paradigms may be ranked with respect to an overall performance measure. The highest ranked paradigm is paired with the lowest ranked paradigm, the next highest with the next lowest, and so on until all paradigms have been paired. Where an odd number of paradigms is employed, a central or pivot paradigm remains unpaired.

A change $\Delta_n$ to be applied to a Q-value of the current paradigm may be determined (block 312) based on the assessment of performance metric(s). In addition, a change $$\frac{\Delta_n}{N}$$

to be applied to a Q-value of another paradigm may be determined for each of 1 to N paradigms $p_n$ (block 314), and the determined change(s) may be applied (block 316), such as by reassigning and/or redistributing a workload associated with the assessed task or action job (block 318). For example, where a target or threshold vector is employed, if $\bar{s}_k$ is more advantageous than $\bar{t}$, then the Q-value for the respective paradigm may be increased; otherwise, the Q-value may be decreased. Alternatively, where paradigm performance metrics are paired and ranked, the higher ranked paradigm Q-value of each respective pair may be "rewarded" or increased according to a decay function, while the lower ranked paradigm Q-value may be "punished," "penalized," or decreased. Where an odd number of paradigms is employed, a Q-value associated with the pivot paradigm may remain unchanged. A check may then be made to determine whether the last paradigm is processed (block 320), returning to paradigm selection using new Q-value(s) if not (block 322) and monitoring for next task to be performed/assessed if so (block 324).

An overall proportional selection relationship may be represented by $$\frac{q_i}{\sum_{k=1}^{3} q_k},$$

so that when a respective action is applied, the overall selection relationship may become $$\frac{a_i q_i}{\sum_{k=1}^{3} a_i q_k},$$

where $a_i=1$.

In embodiments including a target or threshold vector, $\bar{t}$, a number of threshold values $t_n$ may be included for each of n performance metrics that may be evaluated, such as processing time, disk I/O, memory consumption, and/or any other performance metric as may be suitable and/or desired. If a value of a performance metric associated with a particular action is over $|\bar{t}|$, the Q-value associated with the action may be decremented, such as by a predetermined decrement step size or by a decrement step size determined based on performance of the system. The decrement step size may also be distributed as an additive step to other actions. An objective function, such as and/or including a value and/or reward function, may be used to determine whether a selected action will move the system closer to the desired threshold. In embodiments, all of the weights, as represented by respective Q-values, for each adaptive action may be updated simultaneously such that the sum of all Q-values remains constant.

In embodiments, a number of possible system configurations may be determined using the relationship $$\sum_{k=1}^{|a|} \prod_{i=1}^{k} (|a|-i),$$

where $|a|$ may be a total of the types of computing paradigms or architectures, k may be an index indicating a respective computing paradigm or architecture, and i may indicate a respective permutation.

In embodiments, an adjustable "deadband" may be included in resource allocation policy 114 to provide a hysteresis of sorts. Such a deadband may keep work from swapping from one resource to another and back again, and/or prevent a swap when executing the swap would take more time than would be gained from optimal processing the remaining work.

For example, consider user who has a large amount of data processing consisting of computationally intensive work and data intensive work that needs to be performed on a cloud computing environment. The user, such as client 130 in FIG. 1, may submit the work as a request 132 to cloud environment 100 managed by workload policy manager 112. Based on past learned history and experience, embodiments scan incoming workload 132, determine workload 132 consists of primarily two types of data processing work items. A first of the two types may be characterized by relatively light analytical processing across huge amounts of data and may be disk I/O bound. A second of the two types may be characterized by heavy processing on relatively low amounts of data and may be frequently CPU utilization or CPU memory bound. Embodiments may analyze the work and based on resource allocation policy 114 may initially assign the work to the optimal cloud resources needed to perform the task. For example, if cloud 102 includes a code push resource, such as a Hadoop cluster, and cloud 103 includes a data push resource, such as an Unstructured Information Management (UIMA) Asynchronous Scaleout (AS cluster, the first of the two types of workloads may be sent as a job 134 to cloud 102, while the second of the two types of workloads may be sent as a job 136 to cloud 103. If as jobs 134, 136 progress a portion of job 134 becomes CPU bound on the Hadoop cluster, embodiments may determine a remaining amount of work, determine a time to finish the work in its current assigned resource, determine a time to finish the work in another assigned resource, and determine a time to transfer job 134 to another assigned resource. If, for example, embodiments determine that the portion of job 134 may be completed more efficiently on a data push resource and a time savings is greater than the time to transfer job 134, it may transfer job 134 to the data push resource. Embodiments may then use the learning system of resource allocation policy 114 and workload policy manager 112 so that future workloads of a type similar to the portion of job 134 that became bound are automatically routed to a data push resource. As a result, the entire workload presented by request 132 may be more quickly processed using embodiments of the invention disclosed herein, which may provide a user or client with results in a shorter amount of time, which may result in cost reduction since cloud computing generally charges by an amount of resources used.

Figure 4:
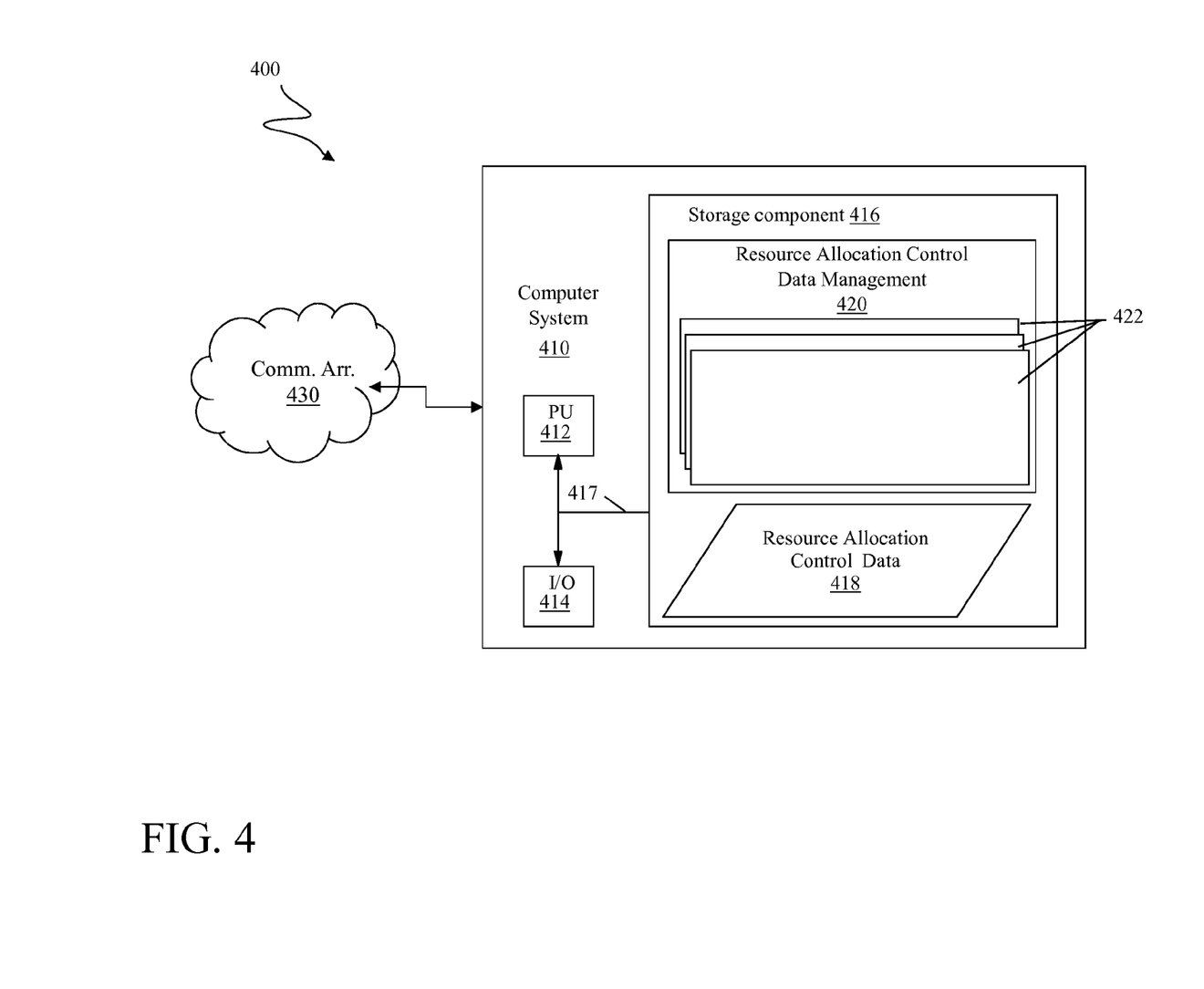
FIG. 4 shows a schematic block diagram of a computing environment for implementing quenching agent delivery control according to embodiments of the invention disclosed herein.

Turning to FIG. 4, an illustrative environment 400 for a resource allocation computer program product is schematically illustrated according to an embodiment of the invention. To this extent, environment 400 includes a computer system 410, such as cloud computing control system 110 of FIG. 1 and/or other computing device that may be part of a cloud computing environment that may perform a process described herein in order to execute a resource allocation control method according to embodiments. In particular, computer system 410 is shown including a resource allocation control program 420, which makes computer system 410 operable to manage data in a resource allocation control system by performing a process described herein, such as an embodiment of the resource allocation control method 300 discussed above.

Computer system 410 is shown including a processing component or unit (PU) 412 (e.g., one or more processors), an input/output (I/O) component 414 (e.g., one or more I/O interfaces and/or devices), a storage component 416 (e.g., a storage hierarchy), and a communications pathway 417. In general, processing component 412 executes program code, such as resource allocation control program 420, which is at least partially fixed in storage component 416, which may include one or more computer readable storage medium or device. While executing program code, processing component 412 may process data, which may result in reading and/or writing transformed data from/to storage component 416 and/or I/O component 414 for further processing. Pathway 417 provides a communications link between each of the components in computer system 410. I/O component 414 may comprise one or more human I/O devices, which enable a human user to interact with computer system 410 and/or one or more communications devices to enable a system user to communicate with computer system 410 using any type of communications link. In embodiments, a communications arrangement 430, such as networking hardware/software, enables computing device 410 to communicate with other devices in and outside of a node in which it is installed. To this extent, resource allocation control program 420 may manage a set of interfaces (e.g., graphical user interface(s), application program interface, and/or the like) that enable human and/or system users to interact with resource allocation control program 420. Further, resource allocation control program 420 may manage (e.g., store, retrieve, create, manipulate, organize, present, etc.) data, such as resource allocation control data 418, using any solution.

Computer system 410 may comprise one or more general purpose computing articles of manufacture (e.g., computing devices) capable of executing program code, such as resource allocation control program 420, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. Additionally, computer code may include object code, source code, and/or executable code, and may form part of a computer program product when on at least one computer readable medium. It is understood that the term "computer readable medium" may comprise one or more of any type of tangible medium of expression, now known or later developed, from which a copy of the program code may be perceived, reproduced, or otherwise communicated by a computing device. For example, the computer readable medium may comprise: one or more portable storage articles of manufacture, including storage devices; one or more memory/storage components of a computing device; paper; and/or the like. Examples of memory/storage components and/or storage devices include magnetic media (floppy diskettes, hard disc drives, tape, etc.), optical media (compact discs, digital versatile/video discs, magneto-optical discs, etc.), random access memory (RAM), read only memory (ROM), flash ROM, erasable programmable read only memory (EPROM), or any other tangible computer readable storage medium now known and/or later developed and/or discovered on which the computer program code is stored and with which the computer program code can be loaded into and executed by a computer. When the computer executes the computer program code, it becomes an apparatus for practicing the invention, and on a general purpose microprocessor, specific logic circuits are created by configuration of the microprocessor with computer code segments.

A technical effect of the executable instructions is to implement a resource allocation control method and/or system and/or computer program product that uses adaptive learning to assign and/or allocate and/or distribute a workload among computing resources in a cloud computing environment, such as computing paradigms and/or architectures provided in the cloud computing environment. Embodiments of the invention may learn characteristics of a workload and of the workload as it would run on different available computing paradigms and learn how to better allocate resources among the different available computing paradigms. Embodiments may employ a look-up table, one or more models, and/or other techniques to determine an allocation ratio, though embodiments may also employ one or more objective functions, value functions, and/or reward functions in determining the allocation ratio. Thus, embodiments may improve an efficiency of computing resource usage, which may save users time and/or money, may increase resource availability, and/or may increase profits to a provider of cloud computing services.

The computer program code may be written in computer instructions executable by the controller, such as in the form of software encoded in any programming language. Examples of suitable computer instruction and/or programming languages include, but are not limited to, assembly language, Verilog, Verilog HDL (Verilog Hardware Description Language), Very High Speed IC Hardware Description Language (VHSIC HDL or VHDL), FORTRAN (Formula Translation), C, C++, C#, Java, ALGOL (Algorithmic Language), BASIC (Beginner All-Purpose Symbolic Instruction Code), APL (A Programming Language), ActiveX, Python, Perl, php, Tcl (Tool Command Language), HTML (HyperText Markup Language), XML (eXtensible Markup Language), and any combination or derivative of one or more of these and/or others now known and/or later developed and/or discovered. To this extent, resource allocation control program 420 may be embodied as any combination of system software and/or application software.

Further, resource allocation control program 420 may be implemented using a set of modules 422. In this case, a module 422 may enable computer system 410 to perform a set of tasks used by resource allocation control program 420, and may be separately developed and/or implemented apart from other portions of resource allocation control program 420. For example, a module 422 may include a computing paradigm model, which may be a representation of a computing paradigm in computer code form that may simulate operation of a computing paradigm so that an execution time or other performance parameter may be determined for a task were it to be performed using the computing paradigm. As used herein, the term "component" means any configuration of hardware, with or without software, which implements the functionality described in conjunction therewith using any solution, while the term "module" means program code that enables a computer system 410 to implement the actions described in conjunction therewith using any solution. When fixed in a storage component 416 of a computer system 410 that includes a processing component 412, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computer system 410.

When computer system 410 comprises multiple computing devices, each computing device may have only a portion of resource allocation control program 420 fixed thereon (e.g., one or more modules 422). However, it is understood that computer system 410 and resource allocation control program 420 are only representative of various possible equivalent computer systems that may perform a process described herein. To this extent, in other embodiments, the functionality provided by computer system 410 and resource allocation control program 420 may be at least partially implemented by one or more computing devices that include any combination of general and/or specific purpose hardware with or without program code. In each embodiment, the hardware and program code, if included, may be created using standard engineering and programming techniques, respectively.

Regardless, when computer system 410 includes multiple computing devices, the computing devices may communicate over any type of communications link. Further, while performing a process described herein, computer system 410 may communicate with one or more other computer systems using any type of communications link. In either case, the communications link may comprise any combination of various types of wired and/or wireless links; comprise any combination of one or more types of networks; and/or utilize any combination of various types of transmission techniques and protocols now known and/or later developed and/or discovered.

As discussed herein, resource allocation control program 420 enables computer system 410 to implement a resource allocation control product and/or method, such as that shown schematically in FIG. 3. Computer system 410 may obtain resource allocation control data 418 using any solution. For example, computer system 410 may generate and/or be used to generate resource allocation control data 418, retrieve resource allocation control data 418 from one or more data stores, receive resource allocation control data 418 from another system or device, and/or the like.

In another embodiment, the invention provides a method of providing a copy of program code, such as resource allocation control program 420 (FIG. 4), which implements some or all of a process described herein, such as that shown schematically in and described with reference to FIGS. 2 and 3. In this case, a computer system may process a copy of program code that implements some or all of a process described herein to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of program code that implements some or all of a process described herein, which includes a computer system receiving the set of data signals described herein, and translating the set of data signals into a copy of the computer program fixed in at least one tangible computer readable medium. In either case, the set of data signals may be transmitted/received using any type of communications link.

In still another embodiment, the invention provides a method of generating a system for implementing a resource allocation control product and/or method. In this case, a computer system, such as computer system 410 (FIG. 4), may be obtained (e.g., created, maintained, made available, etc.), and one or more components for performing a process described herein may be obtained (e.g., created, purchased, used, modified, etc.) and deployed to the computer system. To this extent, the deployment may comprise one or more of: (1) installing program code on a computing device; (2) adding one or more computing and/or I/O devices to the computer system; (3) incorporating and/or modifying the computer system to enable it to perform a process described herein; and/or the like.

It is understood that aspects of the invention can be implemented as part of a business method that performs a process described herein on a subscription, advertising, and/or fee basis. That is, a service provider could offer to implement a resource allocation control product and/or method as described herein. In this case, the service provider can manage (e.g., create, maintain, support, etc.) a computer system, such as computer system 410 (FIG. 4), that performs a process described herein for one or more customers. In return, the service provider can receive payment from the customer(s) under a subscription and/or fee agreement, receive payment from the sale of advertising to one or more third parties, and/or the like.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A cloud computing system having a computing resource including at least one computing device and providing a first service offering at least a first computing paradigm and a second computing paradigm, and a workload policy manager configured to identify a task to be assessed and to assign a workload associated with the task to at least one of the first computing paradigm or the second computing paradigm according to a resource allocation control method that configures the workload policy manager to:

initialize a table of Q-values for the task to be assessed and including a respective Q-value for each respective computing paradigm, each Q-value being set to a respective initial value;

select one of the first computing paradigm or the second computing paradigm as a current computing paradigm for assessment of the task;

determine at least one performance metric of the task to be assessed for the current computing paradigm;

assess the at least one performance metric, wherein assessing the at least one performance metric includes:

defining a target vector including a respective predefined threshold value for each of the at least one performance metric;

defining a system performance vector for each computing paradigm, each system performance vector including a respective value of at least one respective performance metric; and     comparing each system performance vector to the target vector;

determine, responsive to the assessment of the performance metric, a respective change to be applied to a respective Q-value associated with each computing paradigm;

apply the respective changes to the respective Q-values, including:

increasing a respective Q-value associated with each computing paradigm responsive to the respective system performance vector being equal to or exceeding the target vector; and decreasing a respective Q-value associated with each computing paradigm responsive to the system performance vector being less than the target vector; and reassign a workload associated with the task among available computing resources based on a ratio between the Q-values.

2. The cloud computing system of claim 1, wherein the changes to be applied to the Q-values are determined in accordance with a value function of the task to be assessed.

3. The cloud computing system of claim 1, wherein an initial value for each Q-value is one divided by a number of computing paradigms provided by the cloud computing system.

4. The cloud computing system of claim 1, wherein an initial value for each Q-value is selected from prior Q-values so that a sum of the Q-values is equal to one.

5. The cloud computing system of claim 1, wherein the first computing paradigm is a data push computing paradigm.

6. The cloud computing system of claim 5, wherein a first performance metric is an input/output penalty of the workload associated with the task to be assessed and a proportion of the workload assigned to the first computing paradigm is responsive to the input/output penalty.

7. The cloud computing system of claim 1, wherein the second computing paradigm is a code push computing paradigm.

8. The cloud computing system of claim 7, wherein the computing resource includes a plurality of processing nodes, the at least one performance metric includes a measure of a degree of improvement in workload performance as a function of a number of processing nodes to which the workload is assigned, and a proportion of the workload assigned to the second computing paradigm is responsive to the measure of the degree of improvement.

9. The cloud computing system of claim 1, wherein the computing resource further offers a first hybrid computing paradigm including elements of the first computing paradigm responsive to elements of the second computing paradigm.

10. The cloud computing system of claim 1, wherein the computing resource further offers a second hybrid computing paradigm including elements of the second computing paradigm responsive to elements of the first computing paradigm.

11. The cloud computing system of claim 1, wherein the workload policy manager assigns the workload responsive to the relationship $$\frac{q_i}{\sum_{k=1}^{N} q_k},$$

where $q_i$ represents the Q-value of the current computing paradigm and $q_k$ represents each Q-value of N computing paradigms offered by the cloud computing system.

12. A computer program product for enabling resource allocation in a cloud computing environment control system, the computer program product comprising instructions in the form of computer executable program code stored on a non-transitory computer readable storage medium, the cloud computing environment including a first computing resource providing at least a first computing paradigm and a second computing paradigm, the control system being configured for communication with the first computing resource and a client, the control system further including a computing device and a storage device arranged to store the computer program product, the computing device being configured to execute the computer program product, and the computer program product instructions when executed configure the control system to:

identify a task to be assessed;

set a respective Q-value for each computing paradigm to an initial value;

select one of the first computing paradigm or the second computing paradigm for evaluation as a current computing paradigm;

gather a performance metric for the current computing paradigm for assessment of the task;

assess the performance metric, wherein assessing the performance metric includes: defining a target vector including a respective predefined threshold value for each of the performance metric;

defining a system performance vector for each computing paradigm, each system performance vector including a respective value of at least one respective performance metric; and comparing each system performance vector to the target vector;

determine a change to be applied to each respective Q-value of the computing paradigms offered by the cloud computing system;

apply the changes to the current computing paradigm and the other computing paradigm to create new Q-values, including:

increasing a respective Q-value associated with each computing paradigm responsive to the respective system performance vector being equal to or exceeding the target vector; and decreasing a respective Q-value associated with each computing paradigm responsive to the system performance vector being less than the target vector; and assign a workload associated with the task to be assessed to available computing resources according to a ratio of the new Q-values.

13. The computer program product of claim 12, further comprising code that configures the control system to determine the change to be applied the Q-value of the current computing paradigm responsive to a decay function and to determine the change to be applied to the respective Q-value of each additional computing paradigm as the change to be applied to the current computing paradigm divided by a number of computing paradigms offered by the cloud computing environment.

14. A cloud computing environment resource allocation method comprising:

identifying a task to be assessed;

setting a respective Q-value for each computing paradigm to an initial value;

selecting one of the first computing paradigm or the second computing paradigm for evaluation as a current computing paradigm for assessment of the task;

gathering a performance metric for the current computing paradigm;

assessing the performance metric, wherein assessing the performance metric includes:

defining a target vector including a respective predefined threshold value for each of the performance metric;

defining a system performance vector for each computing paradigm, each system performance vector including a respective value of at least one respective performance metric; and comparing each system performance vector to the target vector;

determining a change to be applied to each respective Q-value of the computing paradigms offered by the cloud computing system;

applying the changes to the current computing paradigm and the other computing paradigm to create new Q-values, wherein applying the respective changes to the respective Q-values includes:

increasing a respective Q-value associated with each computing paradigm responsive to the respective system performance vector being equal to or exceeding the target vector; and decreasing a respective Q-value associated with each computing paradigm responsive to the system performance vector being less than the target vector; and assigning a workload associated with the task to be assessed to available computing resources according to a ratio of the new Q-values.

\* \* \* \* \*